United States Patent
Zhou et al.

(10) Patent No.: US 11,700,850 B2
(45) Date of Patent: Jul. 18, 2023

(54) AQUEOUS HERBICIDAL COMPOSITIONS AND METHODS OF USE THEREOF

(71) Applicant: Valent U.S.A., LLC, Walnut Creek, CA (US)

(72) Inventors: Ke Zhou, San Ramon, CA (US); Jane Liu, Pleasanton, CA (US)

(73) Assignee: VALENT U.S.A., LLC, San Ramon, CA (US)

( * ) Notice: Subject to any disclaimer, the term of this patent is extended or adjusted under 35 U.S.C. 154(b) by 0 days.

(21) Appl. No.: 16/700,114

(22) Filed: Dec. 2, 2019

(65) Prior Publication Data

US 2020/0178522 A1 Jun. 11, 2020

Related U.S. Application Data

(60) Provisional application No. 62/775,412, filed on Dec. 5, 2018.

(51) Int. Cl.
| | |
|---|---|
| *A01N 25/22* | (2006.01) |
| *A01N 57/20* | (2006.01) |
| *A01N 43/80* | (2006.01) |
| *A01N 43/38* | (2006.01) |

(52) U.S. Cl.
CPC .............. *A01N 25/22* (2013.01); *A01N 43/38* (2013.01); *A01N 43/80* (2013.01); *A01N 57/20* (2013.01)

(58) Field of Classification Search
None
See application file for complete search history.

(56) References Cited

U.S. PATENT DOCUMENTS

| | | | | |
|---|---|---|---|---|
| 2010/0267561 | A1* | 10/2010 | Stevenson | C07D 401/14 504/137 |
| 2014/0051572 | A1* | 2/2014 | Grigera | A01N 51/00 504/100 |
| 2015/0018402 | A1* | 1/2015 | Liu | A01N 25/04 514/383 |
| 2016/0143287 | A1* | 5/2016 | Refsell | A01N 43/80 504/128 |

FOREIGN PATENT DOCUMENTS

| | | | | |
|---|---|---|---|---|
| AU | 2009248755 B2 * | 4/2015 | ............. | A01N 43/68 |
| WO | WO-2009115490 A2 * | 9/2009 | ............. | A01N 43/80 |

OTHER PUBLICATIONS

Vanderbilt, Van Gel / Veegum For Industrial Applications, (Aug. 10, 2018) Vanderbilt Minerals LLC, p. 1-20 (Year: 2018).*
Technical Data Sheet Xiameter AFE-0300 Antifoam Emulsion, Food Grade, Dow Form No. 95-994-01 H.
Technical Bulletin, Tersperse 2500 Dispersant, Huntsman Corporation, 3485-0316.

* cited by examiner

*Primary Examiner* — Abigail Vanhorn
*Assistant Examiner* — Ali S Saeed
(74) *Attorney, Agent, or Firm* — Wood, Phillips, Katz, Clark & Mortimer

(57) ABSTRACT

The present invention is directed to aqueous herbicidal compositions containing flumiclorac-pentyl, pyroxasulfone and dioctyl sodium sulfosuccinate. The present invention is further directed to a method of controlling weeds by applying compositions of the present invention.

4 Claims, No Drawings

AQUEOUS HERBICIDAL COMPOSITIONS AND METHODS OF USE THEREOF

FIELD OF THE INVENTION

The present invention relates to aqueous herbicidal compositions containing flumiclorac-pentyl, pyroxasulfone and dioctyl sodium sulfosuccinate. The present invention further relates to a method of controlling weeds by applying compositions of the present invention.

BACKGROUND OF THE INVENTION

Unwanted plants, such as weeds, reduce the amount of resources available to crop plants and can have a negative effect on crop plant yield and quality. For example, a weed infestation reportedly was responsible for an 80% reduction in soybean yields. Bruce, J. A., and J. J. Kells, *Horseweed (Conyza canadensis) control in no-tillage soybeans (Glycine max) with preplant and preemergence herbicides*, Weed Technol. 4:642-647 (1990). Therefore, controlling weeds is a major concern of crop growers. Unwanted plants in crop plant environments include broadleaves, grasses and sedges.

Flumiclorac-pentyl (pentyl[2-chloro-4-fluoro-5-(1,3,4,5,6,7-hexahydro-1,3-dioxo-2H-isoindol-2-yl)phenoxy]acetate) is a protoporphyrinogen oxidase ("PPO") inhibitor herbicide used to control weeds among soybeans, peanuts, orchard fruits and many other agricultural crops in the United States and worldwide. For herbicide-resistant weed management, flumiclorac-pentyl is often tank mixed with other pesticides prior to application.

Pyroxasulfone is relatively new isooxazoline herbicide that inhibits synthesis of very-long-chain fatty acids. Pyroxasulfone is used to control weeds among many agricultural crops including corn and soybean.

Of those pesticides flumiclorac-pentyl may be mixed with many contain high concentrations of electrolytes including RoundUp Powermax® (available from Monsanto Technology LLC). RoundUp Powermax® has become widely used in areas in need of weed control. For example, there are many varieties of agricultural crops, such as soybeans, corn, cotton and wheat that are resistant to Roundup Powermax® making its use to control weeds among these crops ideal. However, the significant increase in the area where glyphosate is applied leads to an increase in the potential infestation of glyphosate-resistance weeds. For controlling glyphosate-resistant weeds, Roundup Powermax® is often added to tank mixes of other herbicidal formulations having a different mode of action.

Flumiclorac-pentyl formulations have poor storage stability. This poor stability affects the storage, handling and application of the flumiclorac-pentyl formulations due to precipitates formed during storage. Further physical instability including phase separation, crystallization of active or inert ingredient, settling or sedimentation of a component, gelling, agglomeration, etc., often do not become apparent immediately upon preparation of the composition, but instead are time and temperature dependent. In addition, flumiclorac-pentyl formulations are not physically compatible with high electrolyte pesticides. Thus, there is a need in the art for stable flumiclorac-pentyl formulations that remain stable and that are compatible with high electrolyte pesticides.

SUMMARY OF THE INVENTION

In one embodiment, the present invention is directed to aqueous herbicidal compositions containing flumiclorac-pentyl, pyroxasulfone and dioctyl sodium sulfosuccinate.

In another embodiment, the present invention is directed to methods of controlling weeds comprising applying the compositions of the present invention to a weed or an area in need of weed control.

In another embodiment, the present invention is directed to methods of controlling weeds comprising applying the compositions of the present invention sequentially or concurrently with a compound selected from the group consisting of glyphosate, glufosinate, dicamba, 2,4-D and mixtures thereof.

DETAILED DESCRIPTION OF THE INVENTION

Applicant has discovered a specific wetting agent, dioctyl sodium sulfosuccinate, that is capable of stabilizing compositions containing flumiclorac-pentyl and pyroxasulfone. These compositions are stable over a long duration resulting in long shelf life and ease of use after storage. Further, these compositions are physically compatible with high electrolyte pesticides such as Roundup Powermax® herbicide such that the mixture does not clog the spray nozzle and provides even coverage.

In one embodiment, the present invention is directed to aqueous herbicidal compositions containing flumiclorac-pentyl, pyroxasulfone and dioctyl sodium sulfosuccinate.

In a preferred embodiment, the flumiclorac-pentyl may be present at a concentration from about 1% to about 10% w/w, preferably from about 2% to about 7% w/w, more preferably from about 4% to about 7% w/w, and most preferably at about 4%, 5%, 4.7%, 6% or about 6.2% w/w.

In another preferred embodiment, the pyroxasulfone may be present at a concentration from about 10% to about 40% w/w, preferably from about 15% to about 30% w/w, more preferably from about 17% to about 28% w/w and most preferably at about 17.82%, 18% 27.89% or about 28% w/w.

In another preferred embodiment, the dioctyl sodium sulfosuccinate may be present at a concentration from about 0.1% to about 10% w/w, preferably from about 0.5% to about 5% w/w, more preferably from about 0.5% to about 2% w/w.

In another embodiment, the compositions of the present invention may further comprise one or more excipients selected from dispersants, thickeners, antifreeze agents, antifoaming agents and preservatives.

Dispersants suitable for use in the present invention include, but are not limited to, acrylic graft copolymers. In a preferred embodiment the dispersant is a 35% acrylic graft copolymer.

The dispersant may be present at a concentration from about 0.10% to about 10% w/w, preferably from about 1% to about 10% w/w, more preferably from about 4% to about 8% w/w.

In a preferred embodiment, the 35% acrylic graft copolymer has a density of 1.07 g/mL at 25° C., a flash point of greater than 100° C., a pour point of less than 0° C. and a viscosity of 200 mPa·s at 25° C.

Thickeners suitable for use in the present invention include, but are not limited to, hydroxyethyl cellulose, magnesium aluminum silicate, attapulgite, hydrophilic fumed silica, aluminum oxide and mixtures thereof. In a preferred embodiment, the thickener is a mixture of hydroxyethyl cellulose and magnesium aluminum silicate.

Thickeners may be present at a concentration from about 0.1% to about 10% w/w, preferably from about 0.2% to about 5% w/w, more preferably from about 0.5% to about 2% w/w.

The hydroxyethyl cellulose may be present at a concentration from about 0.05% to about 5% w/w, preferably from about 0.1% to about 2% w/w, more preferably from about 0.1% to about 0.3% w/w.

The magnesium aluminum silicate is present at a concentration from about 0.05% to about 5% w/w, preferably from about 0.1% to about 2% w/w, more preferably from about 0.4% to about 0.6% w/w.

Antifoaming agents suitable for use in the present invention include, but are not limited to, silicone antifoaming agents including silicone emulsions, vegetable oils, acetylenic glycols, and high molecular weight adducts of propylene oxide and lower polyoxyethylene and polyoxypropylene block polymers (wherein the number of octyl-, nonly- and phenylpolyoxyethylene/ethylene oxide units is >5) and long-chain alcohols and mixtures thereof. In a preferred embodiment, the antifoaming agent is a silicone-based antifoaming agent.

Antifoaming agents may be present at a concentration from about 0.01% to about 1% w/w, preferably from about 0.05% to about 0.5% w/w and more preferably about 0.2% w/w.

Antifreeze agents suitable for use in the present invention include, but are not limited to, ethylene glycol, propylene glycol, 1,2-butanediol, 1,3-butanediol, 1,4-butanediol, 1,4-pentanediol, 3-methyl-1,5-pentanediol, 2,3-dimethyl-2,3-butanediol, trimethylol propane, mannitol, sorbitol, glycerin, pentaerythritol, 1,4-cyclohexanedimethanol, xylenol, bisphenols such as bisphenol A and mixtures thereof. In a preferred embodiment, the antifreeze agent is propylene glycol.

Antifreeze agents may be present at a concentration from about 1.0% to about 10% w/w, preferably from about 2.0% to about 9.0% w/w, more preferably from about 3.0% to about 8.0% w/w.

Preservatives suitable for use in the present invention include, but are not limited to, a 1.15% 5-chloro-2-methyl-4-isothiazolin-3-one and 0.35% 2-methyl-4-isothiazolin-3-one solution in water, such as Kathon® CG/ICP (available from Rohm and Haas Company) and Legend MK® (available from Rohm and Haas Company), 19.3% 1, 2-benzisothiazolin-3-one and mixtures thereof. In a preferred embodiment the preservative is 1, 2-benzisothiazolin-3-one.

Preservatives may be present at a concentration from about 0.01% to about 1% w/w, preferably from about 0.1% to about 0.5% w/w.

In another embodiment, the compositions of the present invention may further comprise glyphosate, glufosinate, dicamba, 2,4-D and mixtures thereof.

In a preferred embodiment the present invention is directed to an aqueous herbicidal composition comprising:
from about 4% to about 7% w/w flumiclorac-pentyl;
from about 17% to about 28% w/w pyroxasulfone;
from about 4% to about 8% w/w of a 35% graft copolymer;
from about 0.5% to about 2% w/w dioctyl sodium sulfosuccinate;
from about 0.05% to about 0.5% w/w of a silicone-based antifoaming agent;
from about 0.1% to about 2% w/w hydroxyethyl cellulose;
from about 0.1% to about 2% w/w magnesium aluminum silicate;
from about 0.1% to about 0.5% w/w of 19.3% 1, 2-benzisothiazolin-3-one; and
from about 3% to about 8% w/w propylene glycol.

In another embodiment, the present invention is directed to methods of controlling weeds comprising applying a composition of the present invention to the weeds or an area in need of weed control.

In another preferred embodiment, the compositions of the present invention may be applied sequentially or concurrently with glyphosate, glufosinate, dicamba, 2,4-D and mixtures thereof to control weeds.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying, chemigation (a process of applying the composition through the irrigation system), by granular application, or by impregnating the composition on fertilizer.

The compositions of the present invention can be prepared as concentrate formulations or as ready-to-use formulations. The compositions can be tank mixed.

The compositions and methods of the present invention can be applied successfully to crop plants and weeds that are resistant to glyphosate, glufosinate, or other herbicides. The composition and methods can also be applied to areas where genetically modified crops ("GMOs") or non-GMO crops are growing. The term "GMO crops" as used herein refers to crops that are genetically modified.

The compositions and methods of the present invention may be used for pre-emergence control of weeds.

The compositions and methods of the present invention may be used to increase the speed of glyphosate control of weeds during post-emergence application.

The compositions and methods of the present invention may be used to increase the speed of glyphosate control of weeds during a burn-down application.

As used herein "burn-down" refers to applying a pesticide to weeds post-emergence but prior to emergence of crops.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%. For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following examples are offered by way of illustration only and not by way of limitation.

EXAMPLES

Example 1—Process for Preparation of Compositions of the Present Invention

Excipients including a dispersant, a wetting agent, an antifoaming agent, an antifreeze agent, a preservative and thickener(s) were dissolved or dispersed in water under continuous agitation until the composition was homogenous. Once homogenous, flumiclorac-pentyl and pyroxasulfone were added to the composition. After mixing under highshear agitation, the composition was wet milled to a median particle size of about 2 micrometers using zirconia beads to create the composition of the inventions.

Example 2—Suitability of Various Thickener Systems of Composition X

TABLE 1

| Composition X | |
| --- | --- |
| | Concentration (% w/w) |
| Flumiclorac-pentyl (98.8%) | 4.74 |
| Pyroxasulfone (99.3%) | 28.09 |
| Tersperse ® 2500 | 3.5 |
| Stepfac ® TSP PE K | 2.5 |
| Antifoam FG-10 | 0.05 |
| Thickeners | — |
| Proxel ® GXL | 0.05 |
| Propylene glycol | 7.0 |
| Water | Q.S. |

Tersperse® 2500 is a 35% graft copolymer and is available from Huntsman Petrochemical Corporation.

Stepfac™ TSP PE-K (CAS #163436-84-8) is polyoxyethylene tristyrylphenol phosphate, potassium salt and is available from Stepan Corp.

Antifoam FG-10 is a silicone emulsion antifoaming agent and is available from Performance Chemicals, LLC.

Proxel® GXL is 19.3% 1, 2-benzisothiazolin-3-one and is available from Arch Chemicals, Inc.

Method
Syneresis

Syneresis was determined by placing each composition from Table 2, below, in a 125-milliliter high density polyethylene (HDPE) bottle at 54° C. for 2 weeks. The height of the top clear liquid phase was then measured. Syneresis is calculated using the following equation: Height of top clear liquid phase/height of total sample.

A high syneresis value or "Gel" indicates poor formulation stability.

Attagel® 50 is an inert attapulgite clay powder and is available from BASF.

Attagel® 350 is a medium-sized particle (average dry particle diameter of about 9 microns) gelling agent with the following chemical composition $(Mg,Al)5Si8O20\times4H2O$ (a.k.a. Fuller's earth) and is available from BASF.

Attaflow® FL (CAS #8031-18-3) is used as the source of attapulgite 21% suspension and is available from BASF Catalysts LLC.

Aerosil® 200 (CAS #112 945-52-5, 7631-86-9) is a hydrophilic fumed silica and is available from Evonik Industries.

Aeroxide® Alu C (CAS #1344-28-1) is an aluminum oxide and is available from Evonik Industries.

Cellosize® QP 100MH is a hydroxyethyl cellulose and is available from Dow Chemical Company.

Results

As seen in Table 2, only compositions XB, XE, and XJ containing 3% Attagel® 50, 4% Attagel® 350 and a mixture of 0.2% Cellosize® QP 100 MH, 0.5% Aerosil® 200 and 0.1% Aeroxide® AluC provided suitable syneresis. However, all compositions contained a large amount of white materials on the walls of the containers above the liquid phase.

Example 3—Storage Stability of Thickener Systems of Composition X

Method

Compositions XB, XE and XJ were stored at 54° C. for 2 weeks. Following storage the following properties were determined: syneresis, bottom clear time, sprayability, dispersibility, re-dispersibility, and suspensibility.

Bottom clear time is the time until the formulation flows away from the container bottom when 62.5 milliliters of the formulation is placed in a 125-milliliter plastic jar and placed on its side. A high bottom clear time indicates poor formulation stability.

Sprayability

Sprayability is based on the following test procedure and calculation. A 100-mesh (150 micrometer) sieve is weighed and the weight is recorded as the tare weight ("W0"). The sieve is then placed over a wide mouth jar.

50 grams of a composition ("W") is weighed and added to 600 milliliters of tap water in a beaker and left undisturbed until the composition was thoroughly wet. Once wet the composition was stirred for approximately two minutes to create a dispersion.

The entire dispersion was poured through the sieve followed by rinsing. Rinsing was done using tap water at a flow rate at about 1.5 liters per minute for one minute. The sieve with the residue was then placed in a drying oven and dried

TABLE 2

| Various Thickener Systems for Composition X | | | | | | | | | | |
| --- | --- | --- | --- | --- | --- | --- | --- | --- | --- | --- |
| (% w/w) | XA | XB | XC | XD | XE | XF | XG | XH | XI | XJ |
| Attagel ® 50 | 2 | 3 | 4 | | | | | | | |
| Attagel ® 350 | | | | 2 | 4 | | | | | |
| Attaflow ® FL | | | | | | 4 | | | | |
| Aerosil ® 200 | | | | | | | 1.67 | 0.5 | 0.5 | 0.5 |
| Aeroxide AluC | | | | | | | 0.33 | 0.1 | 0.1 | 0.1 |
| Cellosize ® QP 100 MH | | | | | | | | 0.05 | 0.1 | 0.2 |
| Syneresis (%) | 31.6 | 12.4 | Gel | 40 | 10.3 | Gel | 50 | 54 | 47.3 | 27.5 | to create the dry sieve with the residue ("W1"). Percent sprayability was then calculated with the following equation: (W1−W0)/W*100.

A large percent sprayability indicates poor formulation stability leading to nozzle clogging during field application. In embodiments, the aqueous herbicide formulations have an excellent long-term stability. The long-term stability can be measured using the parameter of sprayability by subjecting the formulation through the following conditions: a) 5 free/thaw cycles from −10° C. to 40° C., b) 2 weeks at 54° C., c) 4 weeks at 50° C., and d) 8 weeks at 50° C. Formulation with a good long-term stability should have a sprayability no more than 0.05% w/w, including no more than 0.03% w/w, or no more than 0.025% w/w, under all conditions.

Dispersibility

Dispersibility was measured by adding one milliliter of a composition to a 100-milliliter graduated cylinder containing 99 milliliters of 342 parts per million hard water. The cylinder was then run through cycles of inversion and reversion with one complete cycle every 2 seconds. Dispersiblity is the number of cycles it takes to disperse the formulation uniformly. A high dispersibility value indicates poor formulation stability.

Redispersibility

After the dispersibility test is done, the dispersed formulation was undisturbed for 24 hours. The cylinder was then run through cycles of inversion and reversion with one complete cycle every two seconds. Redispersiblity is the number of cycles it takes to disperse the formulation uniformly after sitting. A high redispersibility value indicates poor formulation stability.

Suspensibility

Suspensibility is based on the following test procedure and calculation. One gram of a composition ("W") was added to 50 milliliters of 342 parts per million hard water in a beaker and left undisturbed until the composition was thoroughly wet. Once wet the composition was stirred for approximately two minutes to create a dispersion.

The entire dispersion was transferred into a 100-milliliter graduated cylinder. The cylinder was then filled to the 100-milliliter mark using 342 parts per million hard water. The cylinder was run through 30 cycles of inversion and reversion with one complete cycle every two seconds. The graduated cylinder was then left undisturbed for 30 minutes. Following rest, the top 90 milliliters were removed from the cylinder using a vacuum apparatus. The remaining 10 milliliters of material was then transferred into a tared evaporation dish ("W0"). The dish with the material was placed in a drying oven and dried to a constant weight ("W1"). Percent suspensibility was calculated using the following equation: $((W*A/100)-(W1-W0))*111/(W*A/100)$, wherein A=percentage of solid content in the sample (determined from the formulation of the composition).

A low percent suspensibility indicates poor formulation stability leading to precipitation of the composition.

TABLE 3

Storage Properties of Compositions XB, XE and XJ

| Composition | XE | XB | XJ |
| --- | --- | --- | --- |
| Syneresis % | 10.3 | 12.4 | 27.5 |
| Bottom Clear Time (sec) | 90 | 90 | 10 |
| Sprayability (%) 100 mesh | 0.026 | 0.048 | 0.028 |
| Dispersibility | 2 | 2 | 2 |
| Redispersibility | 2 | 2 | 24 |
| Suspensibility % | 92.90 | 99.96 | 99.54 |

Results

As seen in Table 3, above, composition XJ had the best bottom clear time. However, sprayability of the 3 compositions was not ideal. Further, following storage for several months, composition XJ formed a thick layer of paste on top of the liquid surface.

Example 4—Selection of Wetting Agent for Composition XJ

The thick paste described in Example 2 at the top of composition XJ was suspended at 1% w/w in water along with 0.5% w/w of the following wetting agents: Multiwet® MO-70R-LQ-(AP), Stepwet® DF 95, Tersperse® 4894, Pluronic® 104, Morwet® EFW, Morwet® 3028, Morwet® DB and Geowet® W. Only Multiwet® MO-70R-LQ-(AP) was able to wet the thick paste.

Example 5—Storage Properties of Compositions of the Invention

TABLE 4

Compositions of the Invention

| | 1 | 2 | 3 | 4 | 5 | 6 |
| --- | --- | --- | --- | --- | --- | --- |
| Flumiclorac-pentyl (98.8%) | 4.74 | 4.74 | 4.74 | 4.74 | 6.22 | 6.22 |
| Pyroxasulfone (99.3%) | 28.09 | 28.09 | 28.09 | 28.09 | 17.95 | 17.95 |
| Tersperse ® 2500 | 6 | 6 | 6 | 6 | 6 | 6 |
| Stepfac ® TSE PE-K | — | — | 2.5 | 2.5 | — | 2.5 |
| Multiwet ® MO 70R-LQ-(AP) | 1 | 1 | 1 | 1 | 1 | 1 |
| Xiameter ® 0300 | 0.1 | 0.1 | 0.1 | 0.1 | 0.2 | 0.2 |
| Cellosize ® QP 100MH | 0.2 | 0.2 | 0.2 | 0.2 | 0.2 | 0.2 |
| Veegum ® R | — | 0.5 | 1 | 0.5 | 0.5 | 1 |
| Aerosil ® 200 | 1.5 | — | — | — | — | — |
| Aeroxide AluC | 0.3 | — | — | — | — | — |
| Proxel ® GXL | 0.05 | 0.05 | 0.05 | 0.05 | 0.25 | 0.25 |
| Propylene Glycol | 7 | 7 | 7 | 7 | 7 | 7 |
| Glycerin | — | — | — | — | — | — |
| Water | Q.S. | Q.S. | Q.S. | Q.S. | Q.S. | Q.S. |

TABLE 4-continued

Compositions of the Invention

|  | 7 | 8 | 9 | 10 | 11 |
|---|---|---|---|---|---|
| Flumiclorac-pentyl (98.8%) | 6.22 | 6.22 | 6.22 | 6.22 | 6.22 |
| Pyroxasulfone (99.3%) | 17.95 | 17.95 | 17.95 | 17.95 | 17.95 |
| Tersperse ® 2500 | 6 | 6 | 6 | 6 | 6 |
| Stepfac ® TSE PE-K | 2.5 | — | — | — | — |
| Multiwet ® MO 70R-LQ-(AP) | 1 | 1 | 1.5 | 2 | 1 |
| Xiameter ® 0300 | 0.2 | 0.2 | 0.2 | 0.2 | 0.2 |
| Cellosize ® QP 100 MH | 0.2 | 0.2 | 0.2 | 0.2 | 0.2 |
| Veegum ® R | 0.5 | 1 | 1 | 1 | 0.5 |
| Aerosil ® 200 | — | — | — | — | — |
| Aeroxide AluC | — | — | — | — | — |
| Proxel ® GXL | 0.25 | 0.25 | 0.25 | 0.25 | 0.25 |
| Propylene Glycol | 7 | — | — | — | — |
| Glycerin | — | 7 | 7 | 7 | 7 |
| Water | Q.S. | Q.S. | Q.S. | Q.S. | Q.S. |

Xiameter® AFE 0300 is a silicone-based antifoaming agent and is available from Dow Corning Corporation.

Veegum® R (CAS #1302-78-9) is magnesium aluminum silicate and is available from Vanderbilt Minerals, LLC.

Method

Compositions 1-11 were stored at 54° C. for 2 weeks. Following storage, the following properties were determined: syneresis, bottom clear time, sprayability and compatibility with Roundup Powermax®.

TABLE 5

Storage Properties of Compositions 1-11

| Composition | 1 | 2 | 3 | 4 | 5 | 6 |
|---|---|---|---|---|---|---|
| Syneresis % | 35 | 13 | 20 | 25 | 16 | 31 |
| Bottom Clear Time (sec) | n/a | n/a | n/a | n/a | 15 | n/a |
| Sprayability (%) 100 mesh | 0.025 | 0.025 | 0.003 | 0.014 | 0.016 | 0.020 |
| Compatibility | YES | YES | YES | YES | YES | YES |

| Composition | 7 | 8 | 9 | 10 | 11 |
|---|---|---|---|---|---|
| Syneresis % | 45 | n/a | n/a | n/a | 20 |
| Bottom Clear Time (sec) | n/a | n/a | n/a | n/a | 19 |
| Sprayability (%) 100 mesh | 0.013 | 0.003 | 0.004 | 0.004 | 0.009 |
| Compatibility | YES | YES | YES | YES | YES | n/a indicates no data available

Results

As seen in Table 5, above, compositions 5 and 11 had the best bottom clear time. Whereas compositions 3 and 8 had the best sprayability and composition 2 had the best syneresis value.

Example 6—Long-Term Storage Properties of Composition 11

Composition 11 was subjected to 4 extreme temperature conditions, specifically, 5 freeze/thaw cycles (−10° C. to 40° C.), 2 weeks at 54° C., 4 weeks at 50° C., and 8 weeks at 50° C. to determine long-term storage stability. Syneresis, bottom clear time, sprayability, dispersibility, re-dispersibility, and suspensibility were measured prior to and at the conclusion of each of the extreme temperature conditions.

TABLE 6

Long-term Storage Stability of Composition 11

|  | T0 | F/T (5 Cycles) | 54° C. (2 weeks) | 50° C. (4 weeks) | 50° C. (8 weeks) |
|---|---|---|---|---|---|
| Syneresis (%) | — | 33.98 | 20 | 20.91 | 16.67 |
| Bottom clear time (seconds) | — | 2 | 19 | 19 | 20 |
| Sprayability (%) 100 mesh | 0.003 | 0.002 | 0.009 | 0.01 | 0.009 |
| Dispersibility | 3 | 3 | 3 | 3 | 2 |
| Redispersibility | 23 | 7 | 24 | 23 | 20 |
| Suspensibility (%) | 94.02 | 92.18 | 93.06 | 88.75 | 92.04 |

As seen in Table 6, above, composition 11 had suitable physical properties following long term storage.

Example 7—Long-Term Storage Properties of Composition 5

Method

Composition 5 was subjected to 5 extreme temperature conditions, specifically, 5 freeze/thaw cycles (−10° C. to 40° C.), 2 weeks at 54° C., 4 weeks at 50° C., 8 weeks at 50° C., and 16 weeks at 40° C. to determine long-term storage stability. Syneresis, bottom clear time, sprayability, dispersibility, re-dispersibility, and suspensibility were measured prior to and at the conclusion of each of the extreme temperature conditions.

TABLE 7

Long-term Storage Stability of Composition 5

| | Storage Condition | | | | | |
|---|---|---|---|---|---|---|
|  | Initial | F/T 5 cyc | 54° C./ 2 wks | 50° C./ 4 wks | 50° C./ 8 wks | 40° C./ 16 wks |
| Syneresis (%) | — | 22.86 | 16.39 | 13.81 | 26.09 | 25.58 |
| Bottom clear time (sec) | — | 3 | 15 | 22 | 20 | 1 |
| Sprayability (%) 100 mesh | 0.000 | 0.003 | 0.016 | 0.009 | 0.011 | 0.000 |
| Dispersibility | 4 | 4 | 3 | 5 | 3 | 3 |
| Re-dispersibility | 15 | 16 | 16 | 18 | 18 | 16 |
| Suspensibility (%) | 97.01 | 95.35 | 92.31 | 95.70 | 95.86 | 93.93 |

As seen in Table 7, above, composition 5 had suitable physical properties following long term storage.

Example 8—Compatibility of Composition 5 with High Electrolyte Pesticides

Method

Composition 5 was tested for physical compatibility with various high electrolyte pesticides. The physical compatibility test was carried out as follows: water and a high electrolyte pesticide were charged and mixed in a 100-mL graduated cylinder. 1 mL of composition 5 was charged therein, mixed by inverting the cylinder 30 times and then left undisturbed at room temperature for 24 hours. After 24 hours, the dispersion was re-mixed by inverting the cylinder 30 times and passed through a 150 µm-sieve. Compatibility was evaluated by observing if any aggregations were observed (incompatible) or not (compatible) on the sieve. Results of this test can be seen in Table 8, below.

TABLE 8

Compatibility of Composition 5 with High Electrolyte Pesticides

| High Electrolyte Pesticide | Water (g/100 mL) | High Electrolyte Pesticide (g/100 mL) | Compatibility |
| --- | --- | --- | --- |
| Roundup Powermax ® | 94.3 | 4.7 | Yes |
| Roundup Powermax ® II | 95.9 | 3.1 | Yes |
| Roundup WeatherMax ® | 94.3 | 4.7 | Yes |
| XtendiMAX ® | 96.7 | 2.3 | Yes |
| Liberty ® | 94.3 | 4.7 | Yes |

Roundup Powermax® is a 48.7% potassium salt of glyphosate, N-(phosphonomethyl)glycine formulation and is available from Monsanto Technology LLC.

Roundup Powermax® II is a 48.8% potassium salt of glyphosate, N-(phosphonomethyl)glycine formulation and is available from Monsanto Technology LLC.

Roundup Weathermax® II is a 48.8% potassium salt of glyphosate, N-(phosphonomethyl)glycine formulation and is available from Monsanto Technology LLC.

XtendiMAX® is a 42.8% diglycolamine salt of dicamba (3,6-dichloro-o-anisic acid) formulation and is available from Monsanto Technology LLC.

Liberty® is a 24.5% glufosinate-ammonium formulation and is available from Bayer CropScience LP.

Results

As seen in Table 8, above, composition 5 is physically compatible with all pesticides tested.

What is claimed is:

1. An aqueous herbicidal composition consisting of:
   about 6% w/w flumiclorac-pentyl;
   about 18% w/w pyroxasulfone;
   about 6% w/w of a 35% graft copolymer, wherein the 35% graft copolymer has an HLB value of 11 to 12;
   about 1% w/w dioctyl sodium sulfosuccinate;
   about 0.2% w/w silicone emulsion, wherein the silicone emulsion has a viscosity at 25° C. of about 3000 centipoise;
   from about 0.2% to about 0.5% w/w hydroxyethyl cellulose;
   about 0.5% w/w magnesium aluminum silicate;
   about 0.25% w/w of 19.3% 1, 2-benzisothiazolin-3-one;
   about 7% w/w propylene glycol;
   water,
   wherein water is at a concentration sufficient to achieve 100% w/w in the composition,
   wherein w/w denotes weight by total weight of the composition.

2. The herbicidal composition of claim 1 wherein hydroxyethyl cellulose is at a concentration of about 0.3% w/w.

3. A method of controlling a weed comprising applying the composition of claim 1 to the weed or an area in need of weed control.

4. The method of claim 3, wherein the composition of claim 1 is applied sequentially or concurrently with a compound selected from the group consisting of glyphosate, glufosinate, dicamba, 2,4-D and mixtures thereof.

* * * * *